Feb. 23, 1932.  T. H. BUTLER  1,846,842
WING WINDOW FOR MOVING VEHICLES
Filed June 27, 1930
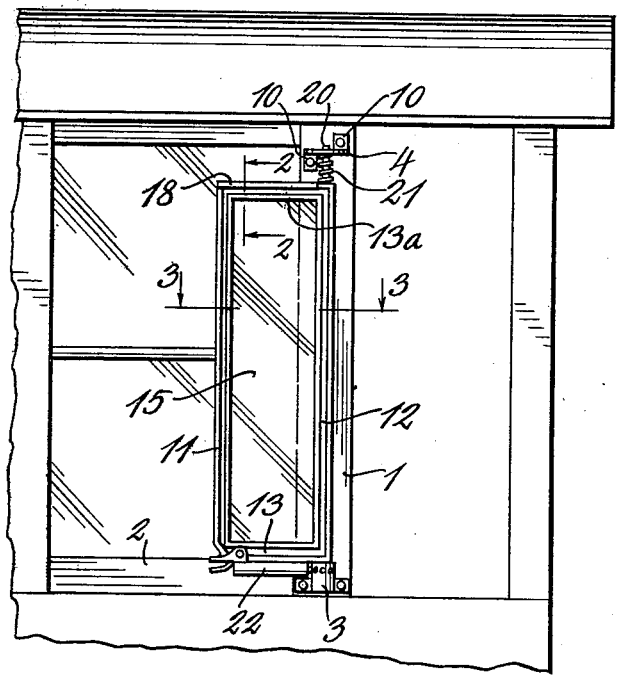
Fig.1.
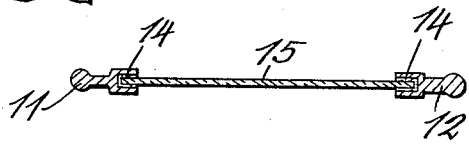
Fig.3.
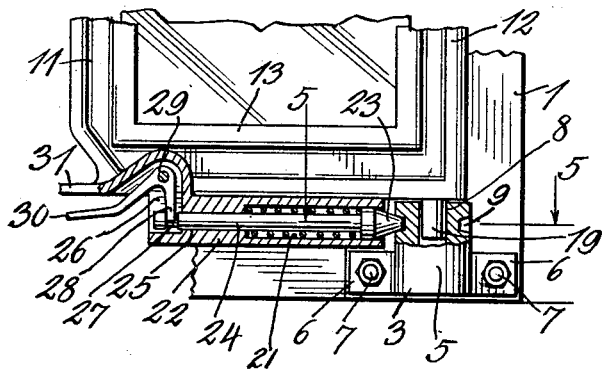
Fig.4.
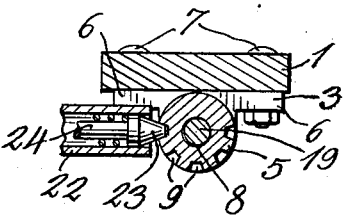
Fig.5.
Fig.2.
Inventor
Thomas H. Butler.
By A. J. O'Brien
Attorney Patented Feb. 23, 1932

1,846,842

UNITED STATES PATENT OFFICE

THOMAS H. BUTLER, OF DENVER, COLORADO, ASSIGNOR OF ONE-FOURTH TO JERRY J. PASTORE AND ONE-FOURTH TO GEORGE A. ALLEN, BOTH OF DENVER, COLORADO

WING WINDOW FOR MOVING VEHICLES

Application filed June 27, 1930. Serial No. 464,267.

This invention relates to improvements in wing windows of the type employed on locomotives and other moving vehicles for the purpose of protecting the engineer or others against injury from dust, dirt and rain, etc., when looking out through the window while the vehicle is moving.

It is well known that engineers and firemen in operating their engine, must frequently stick their heads out through the cab windows in order to obtain a proper view of the track and train. And unless they are protected by means of a windshield or transparent glass member, their eyes are liable to become filled with cinders and dust, and for the purpose of preventing this, it is customary to provide locomotive cabs with wing windows that can be adjusted so as to extend perpendicularly outward so as to serve as a windshield or protector.

Locomotives are always subjected to hard service and it is therefore necessary that every part connected with them shall be very substantial, so as to withstand the rough usage to which it is constantly subjected, and this is true with respect to wing windows as well as other parts of the locomotive.

It is the object of this invention to produce a wing window of substantial construction that has been so designed that it can be quickly attached to a locomotive cab or to the side of a passenger car and quickly removed, and which in addition shall be provided with latching mechanism for the purpose of holding it in adjusted position, and which can be quickly operated so as to change the position of the window whenever this is desirable.

This invention, briefly described, consists of a rectangular frame which is preferably cast from some suitable metal such as aluminum or brass and which is provided at opposite ends with trunnions that are adapted to be inserted into suitable bearings secured to the sides of the vehicle and with a removable glass that closes the opening in the frame. The lower bearing is preferably circular or cylindrical and is provided on its outer surface with a plurality of recesses or openings for the reception of a latching plunger. This plunger is located in a cylindrical opening which is formed integral with or rigidly secured to the lower transverse member of the frame. A spring is located in the opening between the bottom thereof and an enlarged shoulder on the plunger and is tensioned to move the plunger outwardly. A lever is pivotally secured to the frame and has one end connected with the plunger in such a way that the engineer by exerting pressure on this lever can move the plunger into inoperative position for the purpose of adjusting the window.

Having thus briefly described the invention, the same will now be described in detail, and for this purpose reference will be had to the accompanying drawings in which it has been illustrated in its preferred form, and in which:

Fig. 1 is a side elevation of a locomotive cab showing my improved wing window in place thereon;

Fig. 2 is a section taken on line 2—2, Fig. 1, and shows a cross section of the upper transverse member of the frame and the means for holding the glass in place;

Fig. 3 is a section taken on line 3—3, Fig. 1;

Fig. 4 is a view to a slightly enlarged scale of the lower part of the frame and the lower bearing, parts being shown in section to better disclose the construction; and Fig. 5 is a section taken on line 5—5, Fig. 4.

In the drawings reference numeral 1 represents a window casing member of a locomotive cab or any corresponding member associated with the window of any form of moving vehicle, and reference numeral 2 represents the sliding window ordinarily employed with locomotives. Secured to the window casing member 1 are two bearings which have been designated by reference numerals 3 and 4, the bearing designated as 3 is preferably cast from some suitable metal and is provided with a cylindrical body portion 5 and two oppositely extending lugs or ears 6. The lugs are perforated for the reception of bolts or screws 7 by means of which this bearing is secured in place, and the cylindrical body portion has an axial opening 8 and has its outer surface provided with a plurality of angularly spaced recesses 9. The upper bearing is preferably formed from a steel plate or from a piece of casting and has a central semicircular portion from the opposite ends of which lugs 10 extend in opposite directions. The semi-circular portion has an opening for the reception of one of the trunnions of the window frame. The window itself consists of a frame of rectangular shape having parallel sides 11 and 12 which are connected at their upper ends by a transverse frame member 13a and at their lower ends by a frame member 13. The frame is preferably cast from some suitable metal, such as aluminum or brass, or it may be made from steel pressed into the desired shape. If the frame is cast the side and transverse members are formed integral and the two side members 11 and 12 and the bottom transverse member 13 are each provided on their inner edges with grooves 14 for the reception of the glass 15. The upper transverse member instead of having a groove like the others, has an opening 16 that extends entirely through it and has a length equal to the distance between the bottoms of grooves 14 in side members 11 and 12. The upper edge of the upper frame member 13a is preferably provided with outwardly extending flanges 17 to which a slide 18 is attached in the manner shown in Fig. 2. When this slide or closure is in place, it covers the upper end of the window frame and prevents water, snow and ice from flowing through the opening, and down along the sides of the glass. This closure also prevents the glass from falling out when the window is being handled during transportation, and since the slide can be easily removed, it is possible to take out the old window pane and replace it with a new one very quickly and with a small expenditure of labor. The window frame is provided on its lower end with a downwardly extending trunnion 19 that is adapted to extend into the opening 8 in the cylindrical portion of bearing 3 and the upper end of the frame is provided with a trunnion 20 that extends through an opening in the bearing 4. It will be seen from Fig. 1 that the distance between the adjacent surfaces of bearings 3 and 4 is slightly greater than the length of the frame, and that a spring 21 surrounds that portion of the trunnion 20 between the lower surface of bearing 4 and the upper end of the frame. This spring is of such length and so coiled that it can be compressed sufficiently to permit the trunnion 19 to be removed from bearing 3 and in this way the window frame can easily be removed for repairs or for any other reason and can easily be replaced. Since it is necessary to adjust the window frame about the axis of the trunnions and to hold it in adjusted position, the following means have been provided for holding the window frame. Either formed integral with the lower transverse frame member or attached to it by some suitable means is a portion 22 that has an opening extending inwardly from the end nearest trunnion 19. A latching pin having a tapered end portion 23 and a cylindrical body portion 24 is located in the opening and extends through a part of the opening which has been indicated by reference numeral 25 and which is of smaller diameter than opening 21 and terminates in a recess 26. The outer end of member 24 is provided with an annular groove 27 for the reception of the end 28 of a lever that is pivoted at 29 and has an arm 30 extending outwardly and terminating underneath the projection 31 on the frame. By grasping members 30 and 31 and moving them towards each other, the latching pin can be moved outwardly against the action of the spring. The spring tends to move the latching member towards the bearing and holds the tapered end portion 23 in engagement with one of the notches 9, and when the window is to be moved, the pin is withdrawn as above explained and the window can then be rotated about its pivots, to any desired position, when the pin is released it will hold the window in adjusted position.

I want to call particular attention to the latching mechanism shown and described, as I consider this of great importance in a wing window especially when the same is applied to locomotive cabs because on account of its location at the lower end of the window frame, it can be conveniently reached by the engineer whenever he desires to adjust the window and since only a small amount of force is necessary to operate the latching pin there is no danger of an excessive amount of force being applied to the window, as is often the case where the latching means is inconveniently located or of such construction it is difficult to manipulate it. The fact that the window frame can be cast or made from pressed steel makes it very rigid and for this reason the glass is held very securely and is not subjected to strains that tend to warp or break it as is often the case with window frames of this construction where the latching mechanism is located at the top. Since the latching mechanism employed in this invention is located at the bottom, and since the bottom is the place most accessible, it follows that if any excessive amount of force is applied to the window, it will be resisted by the lower transverse frame member and it will not tend to twist or warp the frame as above explained.

The fact that the upper transverse frame member has an opening whose length is equal to the entire width of the glass receiving grooves of the frame, makes it possible to quickly and easily replace a broken window pane at any time as it is not necessary to remove any screws or bolts and this operation therefore does not require any tools whatever.

In the above description the invention has been described in what is believed to be its preferred embodiment, but applicant does not desire to restrict himself to the exact construction shown and described to any greater extent than necessary in order to avoid the state of the prior art.

Attention is called to the fact that the wing window is so constructed that it can be used on either side of a cab or vehicle as it is symmetrical with respect to the plane of the window pane. This is an important feature as it obviates the necessity of carrying "right" and "left" windows in stock whereby a large saving is effected.

Having described the invention what I claim as new is:

A wing window for moving vehicles comprising, a substantially rectangular frame of greater length than width, one of the short end members having a slot of somewhat greater length than the width of the opening in the frame, the inner edges of the side members having grooves and the upper edge of the other end member having a groove, a pane of glass located in the frame with its side edges in the grooves in the side members, one end in the groove in one of the short frame members and the other end located in the opening in the other transverse member and means for closing the last named opening.

In testimony whereof I affix my signature.

THOMAS H. BUTLER.